United States Patent
Ramirez Gordillo et al.

(10) Patent No.: US 10,056,809 B2
(45) Date of Patent: Aug. 21, 2018

(54) SYSTEM AND METHOD FOR DISASSEMBLING A DRIVE PINION ASSEMBLY OF STARTER MOTOR

(71) Applicant: Caterpillar Inc., Peoria, IL (US)

(72) Inventors: Jose R. Ramirez Gordillo, Nuevo Laredo (MX); Juan F. Grimaldo Perez, Nuevo Laredo (MX); Martin S. Tovar Hernández, Nuevo Laredo (MX)

(73) Assignee: Caterpillar Inc., Deerfield, IL (US)

( * ) Notice: Subject to any disclaimer, the term of this patent is extended or adjusted under 35 U.S.C. 154(b) by 422 days.

(21) Appl. No.: 14/828,640

(22) Filed: Aug. 18, 2015

(65) Prior Publication Data

US 2017/0054348 A1    Feb. 23, 2017

(51) Int. Cl.
| | |
|---|---|
| *H02K 15/00* | (2006.01) |
| *F02N 1/00* | (2006.01) |
| *H02K 7/00* | (2006.01) |
| *F02N 15/02* | (2006.01) |

(52) U.S. Cl.
CPC .......... *H02K 15/0006* (2013.01); *F02N 1/00* (2013.01); *H02K 7/003* (2013.01); *F02N 15/02* (2013.01); *Y10T 29/53274* (2015.01)

(58) Field of Classification Search
CPC .... H02K 15/0006; H02K 15/14; H02K 7/003; F02N 15/02; Y10T 29/53274
See application file for complete search history.

(56) References Cited

U.S. PATENT DOCUMENTS

| | | | |
|---|---|---|---|
| 3,724,056 A | 4/1973 | Antal | |
| 3,967,361 A | 7/1976 | Merkel et al. | |
| 4,065,843 A | 1/1978 | Elola | |
| 4,152,822 A * | 5/1979 | Duff .................. | H02K 15/0006 228/19 |
| 4,288,915 A * | 9/1981 | Bell ................... | H02K 15/0006 29/597 |
| 4,785,679 A * | 11/1988 | Weber ..................... | F02N 11/14 74/7 R |
| 4,869,354 A * | 9/1989 | Brazier ................... | F16D 11/10 192/69.9 |

(Continued)

FOREIGN PATENT DOCUMENTS

JP            59092739 A  *  5/1984  ......... H02K 15/0006

*Primary Examiner* — Peter DungBa Vo
*Assistant Examiner* — Jeffrey Carley (57) ABSTRACT

A system for disassembling a drive pinion assembly of a starter motor is disclosed. The drive pinion assembly includes a drive gear and a pinion member coupled to the drive gear through a mounting hole defined in the drive gear. The system includes a base member for supporting the drive pinion assembly. The base member includes a through hole to align with the mounting hole of the drive gear. The system further includes a pin member slidably received in the through hole and an actuating member disposed around the base member. The actuating member is rotatable about a rotational axis defined by the base member. The actuating member includes a cam lobe for moving the pin member towards the mounting hole of the drive gear based on movement of the actuating member about the rotational axis to disassemble the pinion member from the drive gear.

20 Claims, 6 Drawing Sheets

(56) References Cited

U.S. PATENT DOCUMENTS

| | | | |
|---|---|---|---|
| 5,018,414 A * | 5/1991 | Naumann | B25B 27/0035 |
| | | | 81/484 |
| 5,177,849 A | 1/1993 | Johnson | |
| 5,878,471 A | 3/1999 | Hardy | |
| 2002/0047421 A1 * | 4/2002 | Iwata | F02B 63/04 |
| | | | 310/153 |
| 2011/0072627 A1 * | 3/2011 | Ohl, Jr. | B23P 11/00 |
| | | | 29/239 |
| 2015/0020360 A1 | 1/2015 | Nanney | |
| 2016/0149475 A1 * | 5/2016 | Benedicto | H02K 15/0006 |
| | | | 29/596 |

* cited by examiner

SYSTEM AND METHOD FOR DISASSEMBLING A DRIVE PINION ASSEMBLY OF STARTER MOTOR

TECHNICAL FIELD

The present disclosure relates to a system and a method for disassembling a drive pinion assembly of a starter motor.

BACKGROUND

Starter motors are generally used for cranking engines. The starter motor includes a drive gear to engage with an annular gear defined on a flywheel of the engine. The drive gear is coupled to a motor drive of the starter motor via multiple pinion members. The pinion members are disposed within a hollow space defined in the drive gear. Each of the pinion members has a pin portion that is engaged with a mounting hole provided in the drive gear. After a prolonged operation of the starter motor, the pin portion may tightly engage with the mounting hole such that it becomes difficult to remove the pinion members from the drive gear during disassembling of the starter motor.

U.S. Pat. No. 4,065,843 discloses a hydraulic press for simultaneous removal of all brake lining rivets from a brake shoe. The brake shoe is magnetically retained between a bottom surface of a curved punch retainer and an anvil until a hydraulic system forces the anvil up to clamp the brake shoe. Hydraulic pressure then automatically forces a curved press against top ends of spring-loaded drive punches appropriately positioned in the punch retainer so that they move to force the brake lining rivets from the shoe and through the anvil.

SUMMARY OF THE DISCLOSURE

In one aspect of the current disclosure, a system for disassembling a drive pinion assembly of a starter motor is provided. The drive pinion assembly includes a drive gear and a pinion member coupled to the drive gear through a mounting hole defined in the drive gear. The system includes a base member configured to support the drive pinion assembly therein. The base member includes a through hole configured to align with the mounting hole of the drive gear. The system further includes a pin member configured to be slidably received in the through hole. The system further includes an actuating member disposed around the base member and rotatable about a rotational axis defined by the base member. The actuating member includes a cam lobe configured to move the pin member towards the mounting hole of the drive gear based on movement of the actuating member about the rotational axis to disassemble the pinion member from the drive gear.

In another aspect of the current disclosure, a method of disassembling a drive pinion assembly of a starter motor is provided. The drive pinion assembly includes a drive gear and a pinion member coupled to the drive gear through a mounting hole defined in the drive gear. The method includes supporting the drive pinion assembly on a base member and aligning the mounting hole of the drive gear with a through hole defined in the base member. The method further includes disposing a pin member in the through hole and disposing an actuating member around the base member. The method further includes rotating the actuating member about a rotational axis defined by the base member. A cam lobe is defined in the actuating member to move the pin member towards the mounting hole to disassemble the pinion member from the drive gear.

In yet another aspect of the current disclosure, a system for disassembling a drive pinion assembly of a starter motor is provided. The drive pinion assembly includes a drive gear and a pinion member coupled to the drive gear through a mounting hole defined in the drive gear. The system includes a base member configured to support the drive pinion assembly therein. The base member includes a through hole configured to align with the mounting hole of the drive gear. The system further includes a pin member having a head portion and a shank portion extending from the head portion. The shank portion is slidably received within the through hole. The system further includes an actuating member disposed around the base member and rotatable about a rotational axis defined by the base member. The actuating member includes a first member rotatably disposed around the base member and a second member disposed on the first member. The second member includes a cam lobe defined at an inner surface thereof to engage with the head portion of the pin member. The rotation of the actuating member causes rotation of the cam lobe to move the pin member toward the mounting hole of the drive gear to disassemble the pinion member from the drive gear. The system further includes a handle coupled to the actuating member to receive an input from an operator and to move the actuating member about the rotational axis.

Other features and aspects of this disclosure will be apparent from the following description and the accompanying drawings.

DETAILED DESCRIPTION

Reference will now be made in detail to specific aspects or features, examples of which are illustrated in the accompanying drawings. Wherever possible, corresponding or similar reference numbers will be used throughout the drawings to refer to the same or corresponding parts.

Figure 1:
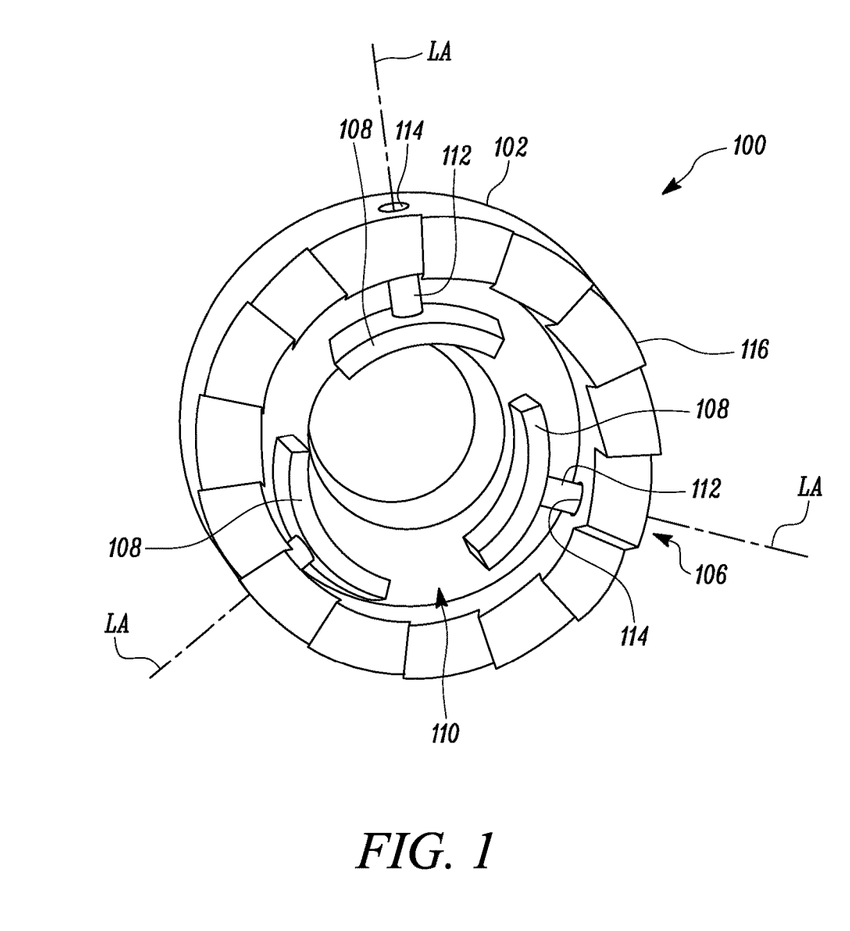
FIG. 1 is a bottom perspective view of an exemplary drive pinion assembly.

FIG. 1 illustrates a bottom perspective view of an exemplary drive pinion assembly 100 of a starter motor (not shown). The starter motor is used to crank an engine of a machine, such as an on-road vehicle, an off-road vehicle and generator sets. The starter motor may include a motor drive disposed within a frame thereof. The motor drive may be communicated with an electric power device, such as a battery to generate a rotary power. The motor drive may be further coupled to the drive pinion assembly 100.

The drive pinion assembly 100 includes a drive gear 102 having a top end 104 (shown in FIG. 2) and a bottom end 106. The top end 104 may be configured to engage with an annular gear defined in a flywheel of the engine and the bottom end 106 may be coupled with the motor drive. The drive pinion assembly 100 further includes multiple pinion members 108 coupled to the bottom end 106 of the drive gear 102. The pinion members 108 may be configured to couple the drive gear 102 with the motor drive. The pinion members 108 are disposed within a space 110 defined adjacent to the bottom end 106 of the drive gear 102. Each of the pinion members 108 includes a pin portion 112 received within a mounting hole 114 defined in a wall 116 of the drive gear 102. As shown in FIG. 1, three pinion members 108 are coupled to the drive gear 102. Each of the pinion members 108 is disposed at equal distance with respect to adjacent pinion member 108. During disassembling of the starter motor, a system 120, illustrated in detail in FIGS. 2 and 3, is used for disassembling the multiple pinion members 108 from the drive gear 102.

Figure 2:
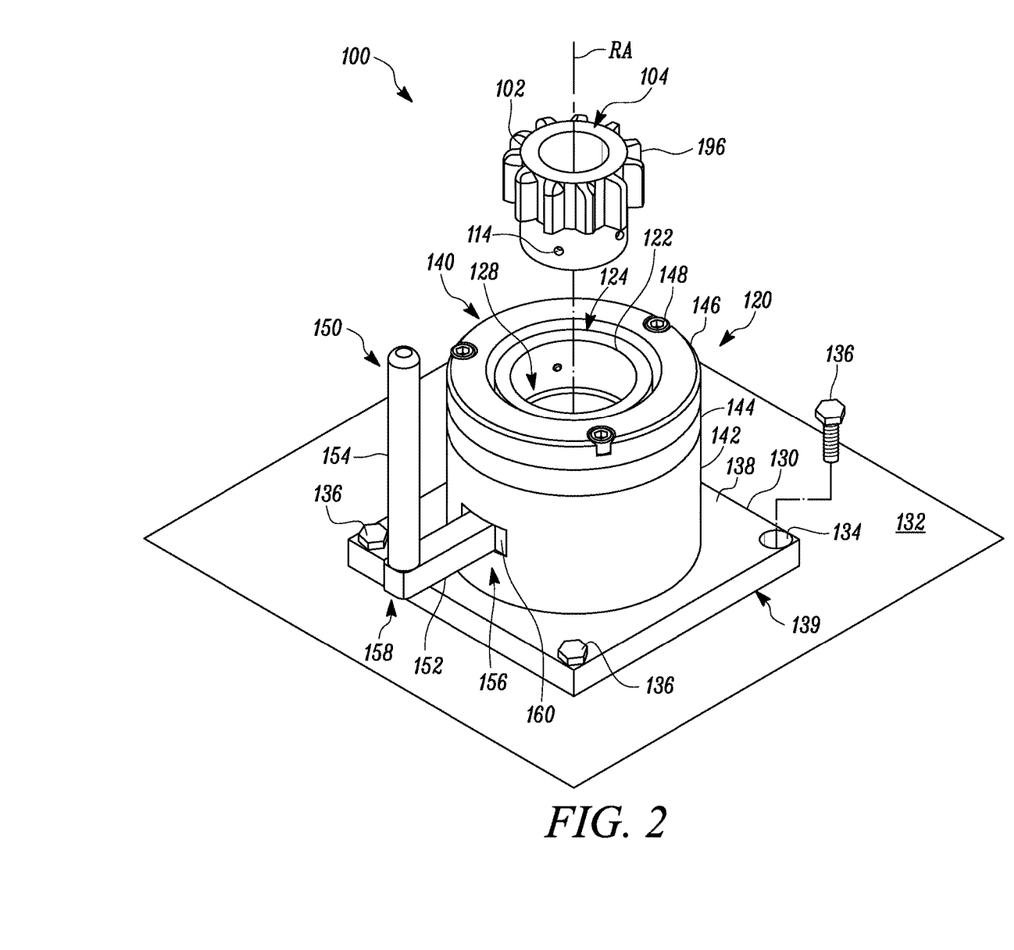
FIG. 2 is a perspective view of a system used for disassembling the drive pinion assembly of FIG. 1, according to an embodiment of the present disclosure.
Figure 3:
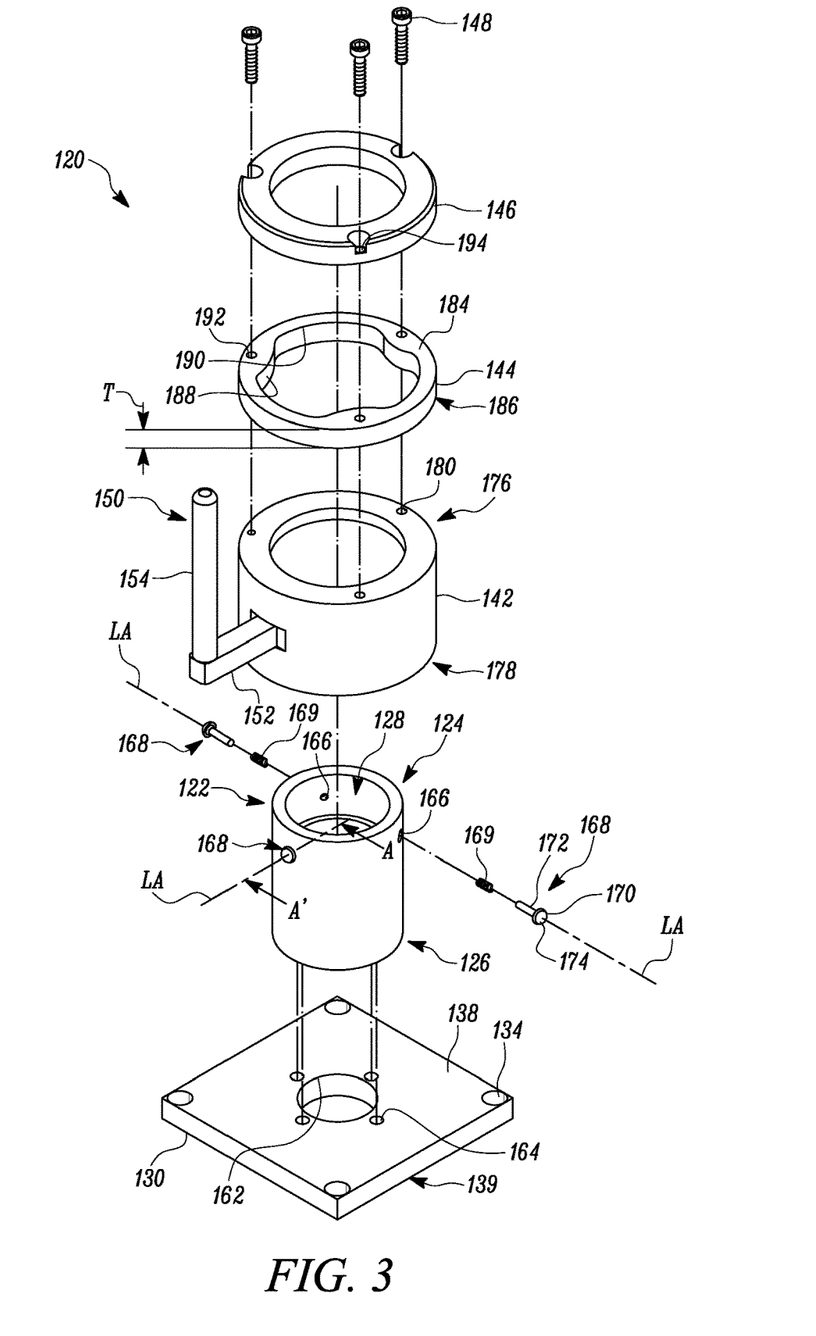
FIG. 3 is an exploded view of the system of FIG. 2, according to an embodiment of the present disclosure.

FIG. 2 illustrates a perspective view of the system 120, according to an embodiment of the present disclosure. The system 120 includes a base member 122 configured to support the drive pinion assembly 100. The base member 122 is configured to support the bottom end 106 of the drive gear 102. The base member 122 is a cylindrical body having a first end 124 and a second end 126 (shown in FIG. 3). A hollow space 128 is defined adjacent to the first end 124 to receive the bottom end 106 of the drive gear 102. The hollow space 128 has a circular cross section corresponding to a circular cross section of the drive gear 102. An inner diameter of the base member 122, which defines the hollow space 128, is greater than or equal to an outer diameter defined by the wall 116 of the drive gear 102 adjacent to the bottom end 106 thereof.

The base member 122 further includes a support member 130 coupled to the second end 126 thereof. The support member 130 is configured to detachably couple the base member 122 on a work surface 132. The support member 130 includes multiple mounting through holes 134 for receive fastening members 136, such as bolts. The support member 130 is a metallic plate defining a first surface 138 and a second surface 139. In other embodiments, the support member 130 may be made from various materials, for example, a plastic, a wood, or any other material known in the art. The first surface 138 of the support member 130 is configured to engage with the second end 126 of the base member 122 and the second surface 139 is configured to engage with the work surface 132. In the illustrated embodiment, the support member 130 has a square shape. However, in various embodiments, the shape of the support member 130 may be a rectangular, a polygonal, an elliptical, a polygonal or any other shape known in the art. Although the support member 130 is coupled to the work surface 132 via the fastening members 136, in various embodiments, the support member 130 may be detachably coupled to the work surface 132 via a clamping mechanism, a locking mechanism, or any other coupling mechanism known in the art.

The system 120 further includes an actuating member 140 disposed on the support member 130 around the base member 122. The actuating member 140 is further rotatable about a rotational axis 'RA' defined by the base member 122. In the illustrated embodiment, the actuating member 140 includes a first member 142 rotatably disposed on the support member 130 and a second member 144 disposed on the first member 142. Further, a third member 146 is coupled with the first and second members 142, 144 via fastening members 148, such as bolts or bolt studs. Thus the first, second and third members 142, 144, 146 are together configured to be rotated about the rotational axis 'RA'. The third member 146 may be coupled to the first and second members 142, 144 via any other coupling mechanism known in the art. In an alternative embodiment of the present disclosure, the actuating member 140 may include the first member 142 and the second member 144 coupled to the first member 142 via the fastening members 148 such that the first and second members 142, 144 may be rotated about the rotational axis 'RA'.

The system 120 further includes a handle 150 coupled to the actuating member 140 to receive an input from an operator to rotate the actuating member 140 about the rotational axis 'RA'. The input may correspond to a force applied by the operator on the handle 150 manually to rotate the actuating member 140. In other embodiments, the handle 150 may be configured to receive an input based on actuation of a power device, such as a hydraulic system, a pneumatic system, an electric system, or any other power device known in the art. In such a case, the power device may be actuated by the operator to control the rotation of the actuating member 140 about the rotational axis 'RA'. Although the handle 150 is coupled to the first member 142 in the embodiment shown, in other embodiments the handle 150 may be coupled to the second member 144 or the third member 146 of the actuating member 140. The handle 150 includes a first handle member 152 coupled to the first member 142 of the actuating member 140. The handle 150 further includes a second handle member 154 coupled to the first handle member 152. The second handle member 154 may receive the input from the operator. The first handle member 152 includes a first end 156 configured to be coupled with the first member 142 via one or more fastening members, such as bolts and a second end 158 configured to be coupled with the second handle member 154 via one or more fastening members, such as bolts. A flat surface 160 is defined on the first member 142 to engage with the first end 156 of the first handle member 152. In another embodiment, the handle 150 may be integrated with the first member 142. In yet another embodiment, the second handle member 154 may be integrated with the first handle member 152. Moreover, the first handle member 152 may be provided with grip for the operator to firmly hold the handle 150.

FIG. 3 illustrates an exploded view of the system 120, according to an embodiment of the present disclosure. The support member 130 includes an opening 162 extending between the first surface 138 and the second surface 139 thereof. The opening 162 has a circular cross section defining an inner diameter. The support member 130 further includes multiple holes 164 defined around the opening 162. Each of the holes 164 may be configured to receive a fastening member, such as a bolt. The second end 126 of the base member 122 may include multiple blind holes corresponding to the multiple holes 164. Each of the blind holes may be configured to receive the fastening member, such that the base member 122 is coupled to the support member 130 via the fastening member.

During an assembly of the system 120, the second end 126 of the base member 122 may be disposed on the first surface 138 of the support member 130. Further, the bind holes of the base member 122 may be aligned with the holes 164 of the support member 130. The fastening members may be further inserted from the second surface 139 of the support member 130 to couple the support member 130 with the base member 122. The support member 130 may be further coupled to the work surface 132 by inserting the fastening members 136 through the mounting through holes 134 from the first surface 138 thereof. The work surface 132 may include mounting holes corresponding to the mounting through holes 134 of the support member 130.

The hollow space 128 defined at the first end 124 of the base member 122 further extends up to the second end 126 such that the hollow space 128 communicates with the opening 162 of the support member 130. The inner diameter of the opening 162 may be equal to or less than the inner diameter of the hollow space 128. Thus the opening 162 along with the hollow space 128 is configured to receive the pinion members 108 disassembled from the drive gear 102.

The base member 122 further includes multiple through holes 166 defined adjacent to the first end 124 thereof. In the illustrated embodiment, the base member 122 includes three through holes 166 corresponding to the three pinion members 108 of the drive pinion assembly 100. In various embodiments, the base member 122 may include one or more through holes 166 corresponding to the number of pinion members 108 coupled to the drive gear 102. Each of the through holes 166 extends radially with respect to the rotational axis 'RA'. Further, each of the through holes 166 is spaced at a distance corresponding to a distance of each of the mounting holes 114 with respect to adjacent mounting hole 114 in the drive gear 102. Each of the through holes 166 is configured to align with each of the mounting holes 114 during disassembling of the drive pinion assembly 100. An inner diameter of the through hole 166 may be equal to or greater than an inner diameter of the mounting hole 114.

Figure 4:
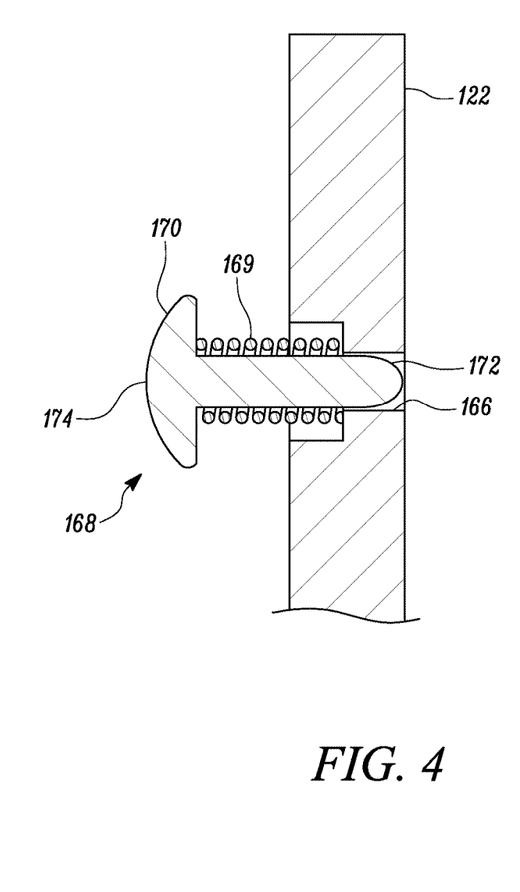
FIG. 4 is a sectional view of an actuating member of the system taken along line A-A' of FIG. 3, according to an embodiment of the present disclosure.

Each of the through holes 166 is further configured to receive a pin member 168. One of the pin members 168 is shown to be disposed within the through hole 166 for illustration purpose. Referring to FIG. 4, which illustrates a sectional view of the actuating member 140 taken along line A-A' of FIG. 3, the pin member 168 is slidably received within the through hole 166. The pin member 168 is further resiliently disposed within the through hole 166 of the base member 122 via an elastic member 169, such as a spring. The through hole 166 includes a step portion 171 to support the elastic member 169 therein. The pin member 168 includes a head portion 170 and a shank portion 172 extending from the head portion 170. The shank portion 172 is configured to be slidably received within the through hole 166. The shank portion 172 has an outer diameter less than or equal to an inner diameter of the mounting hole 114 of the drive gear 102, such that the pin member 168 is slidably received within the through hole 166. Moreover, the shank portion 172 is inserted through the elastic member 169 and supported by the head portion 170.

During disassembling of the drive pinion assembly 100, the pin member 168 is inserted from outside of the base member 122 such that the pin member 168 is biased against the elastic member 169 and the head portion 170 projects above an outer surface of the base member 122. The shank portion 172 may have a length greater than or equal to a thickness together defined by a wall of the base member 122 and the wall 116 of the drive gear 102 such that, the shank portion 172 may move within the mounting hole 114 of the drive gear 102. The head portion 170 of the pin member 168 is configured to define an engagement surface 174. The engagement surface 174 is defined in a convex shape. However, in various embodiments, the engagement surface 174 may be defined in various shapes, such as a spherical shape, a hemispherical shape, or any other shape known in the art. In an alternative embodiment, the pin member 168 may include the shank portion 172 having a first end configured to be inserted into the through hole 166 and a second end configured to define the engagement surface 174.

In the illustrated embodiment, the first member 142 is a hollow cylindrical body having a first end 176 and a second end 178. An inner diameter of the first member 142 is greater than or equal to an outer diameter of the base member 122 such that the first member 142 is rotatably disposed on the support member 130 around the base member 122. The second end 178 of the first member 142 contacts with the first surface 138 of the support member 130. Further, the second end 178 is configured to be moved relative to the first surface 138 of the support member 130. The first member 142 further includes multiple blind holes 180 defined adjacent to the first end 176 thereof. Each of the blind holes 180 is configured to engage with the fastening member 148, such as a bolt or a bolt stud.

The second member 144 is a ring body defining a thickness 'T' extending between a first surface 184 and a second surface 186 thereof. The second member 144 includes multiple cam lobes 188 defined at an inner surface 190 thereof. The cam lobes 188 are configured to engage with the head portion 170 of each of the pin members 168. The engagement surface 174 of the head portion 170 of each of the cam lobes 188 is configured to follow the inner surface 190 including the came lobe 188 of the second member 144 during rotation of the actuating member 140 about the rotational axis 'RA'. Each of the cam lobes 188 defines a lobe lift 'l' greater than or equal to a length of the mounting hole 114 of the drive gear 102. The length of the mounting hole 114 corresponds to a thickness of the wall 116 of the drive gear 102. In the illustrated embodiment, the second member 144 includes three cam lobes 188 corresponding to the three pinion members 108. However, it may be contemplated that the second member 144 may include one or more cam lobes 188. The second member 144 further includes multiple holes 192 configured to receive the fastening member 148 therethrough. In one embodiment, the second member 144 may be coupled to the first member 142 via the fastening member 148. In another embodiment, the second member 144 may be integrally coupled with the first member 142. In yet another embodiment, a height of the first member 142 defining between the first end 176 and the second end 178 may be extended by the thickness 'T' of the second member 144. Further the cam lobes 188 may be defined adjacent to the first end 176 of the first member 142.

In the illustrated embodiment, the third member 146 is configured to be coupled with the first and second members 142, 144 via the fastening members 148. The third member 146 is a ring body having multiple holes 194 configured to receive the fastening members 148 therethrough. During assembly of the system 120, the holes 192, 194 of the second and third members 144, 146, respectively, may be aligned with the blind holes 180 of the first member 142 to couple the first, second and third members 142, 144, 146 with the fastening members 148.

Figure 5:
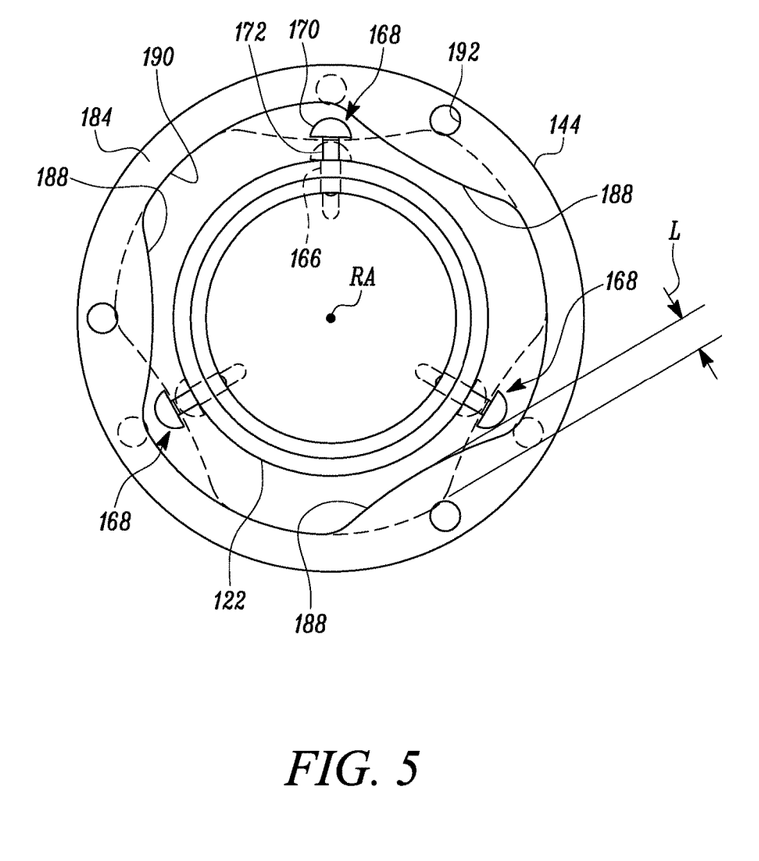
FIG. 5 shows a movement of the actuating member relative to a base member of the system, according to an embodiment of the present disclosure.
Figure 6:
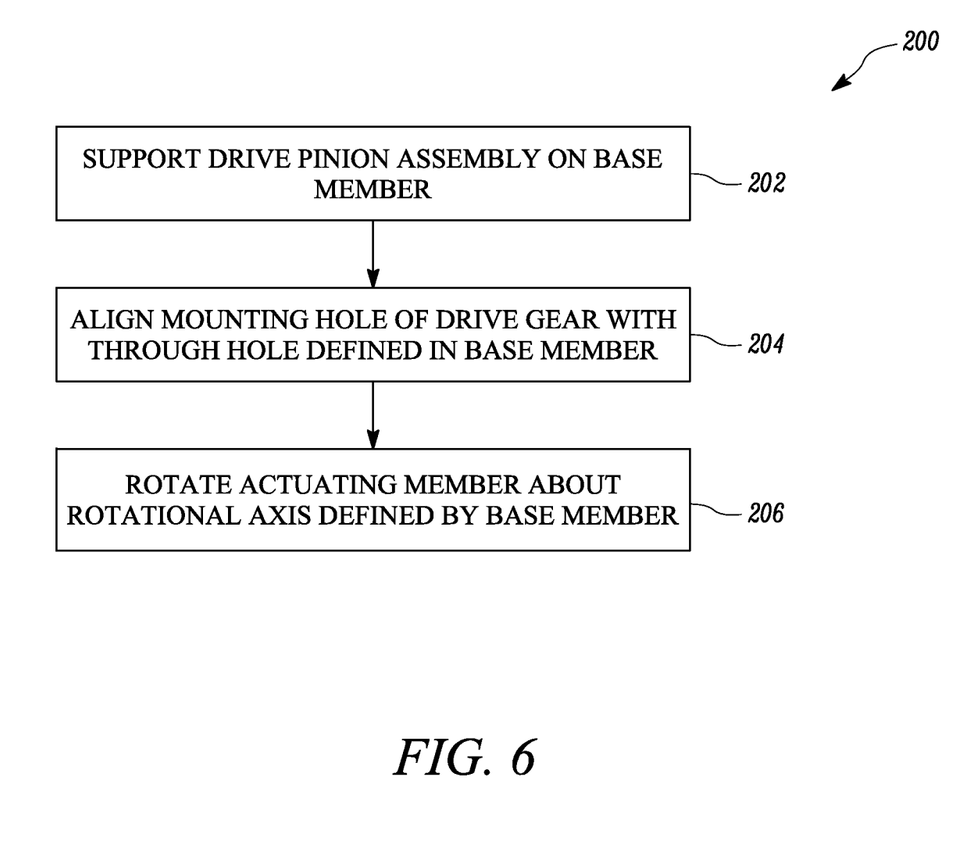
FIG. 6 is a flowchart of a method of disassembling the drive pinion assembly, according to an embodiment of the present disclosure.

FIG. 5 illustrates a movement of the actuating member 140 relative to the base member 122, according to an embodiment of the present disclosure. During disassembling of the drive pinion assembly 100, the operator may hold the handle 150 to rotate the actuating member 140 about the rotational axis 'RA'. The rotation of the actuating member 140 causes rotation of the cam lobes 188. Each of the cam lobes 188 moves a corresponding pin member 168 against a biasing force of the elastic member 169 along a lateral axis 'LA' (shown in FIGS. 1 and 3) defined together by the through hole 166 of the base member 122 and the mounting hole 114 of the drive gear 102. The pin members 168 may engage with the pin portions 112 of the pinion members 108 within the mounting holes 114 of the drive gear 102 to disassemble the pinion members 108 from the drive gear 102. The disassembled pinion members 108 may fall down through the hollow space 128 of the base member 122 and the opening 162 of the support member 130 such that the pinion members 108 may be collected in a bin. After disassembling the pinion members 108, the pin members 168 may come back to an original position thereof due to the biasing force of the elastic members 169.

INDUSTRIAL APPLICABILITY

The present disclosure relates to the system 120 and a method 200 for disassembling the drive pinion assembly 100 of the starter motor. The drive pinion assembly 100 is supported on the base member 122 and the mounting holes 114 of the drive gear 102 are aligned with the through holes 166 of the base member 122. The pin members 168 are further slidably disposed within the through holes 166 and the actuating member 140 is disposed around the base member 122. The actuating member 140 is further rotated about the rotational axis 'RA', such that the cam lobes 188 move the pin members 168 along the lateral axis 'LA' to disassemble the pinion members 108 from the drive gear 102.

FIG. 5 is a flowchart of the method 200 of disassembling the drive pinion assembly 100, according to an embodiment of the present disclosure. At step 202, the method 200 includes supporting the drive pinion assembly 100 on the base member 122. The method 200 further includes supporting the base member 122 on the work surface 132. The second end 126 of the base member 122 is coupled to the support member 130. The support member 130 is further coupled to the work surface 132 via the fastening members 136. Thus the opening 162 of the support member 130 is communicated with the hollow space 128 of the base member 122. Further, the drive pinion assembly 100 is supported adjacent to the first end 124 of the base member 122. The bottom end 106 of the drive gear 102 is received within the hollow space 128 adjacent to the first end 124 of the base member 122. An outer diameter of teeth 196 (shown in FIG. 2) provided adjacent to the top end 104 of the drive gear 102 is greater than the inner diameter of the hollow space 128 such that the drive gear 102 is supported on the base member 122.

At step 204, the method 200 includes aligning the mounting holes 114 of the drive gear 102 with the through holes 166 of the base member 122. In an example, one or more indication marks may be defined in the base member 122 to align the mounting holes 114 with the through holes 166. In various examples, a color mark, an engraved mark, or any other mark may be provided in the base member 122 to align the mounting holes 114 with the through holes 166 of the base member 122.

The pin members 168 are further disposed within the through holes 166. The shank portion 172 of each of the pin members 168 is inserted into each of the through holes 166 such that the head portion 170 of each of the pin members 168 may project above the outer surface of the base member 122. Thus the pin members 168 may be positioned within the through holes 166. The actuating member 140 having the cam lobes 188 is disposed around the base member 122. The first member 142 is disposed on the support member 130 around the base member 122. Further, each of the cam lobes 188 defined at the inner surface 190 of the second member 144 is aligned between two adjacent pin members 168 such that the second member 144 is disposed on the first member 142. Moreover, an inner diameter defined by the inner surface 190 of the second member 144 is greater than the outer diameter of the base member 122 at least by the lobe lift 'L' of the cam lobe 188. Thus, in a normal position of the actuating member 140, each of the cam lobes 188 is disposed between two adjacent pin members 168. In one embodiment, the method 200 may include coupling the second member 144 with the first member 142 via the fastening members 148 such that the first and second members 142, 144 may rotate about the rotational axis 'RA' based on the input received from the operator. In another embodiment, the method 200 may include coupling the first and second members 142, 144 with the third member 146 via the fastening members 148 such that the first, second and third members 142, 144, 146 rotate about the rotational axis 'RA'.

At step 206, the method 200 includes rotating the actuating member 140 about the rotational axis 'RA'. The operator holds the handle 150 to rotate the actuating member 140 about the rotational axis 'RA'. As the actuating member 140 rotates about the rotational axis 'RA', each of the cam lobes 188 engages with the head portion 170 of each of the pin members 168 and moves the pin member 168 along the lateral axis 'LA'. Each of the pin members 168 further pushes the pin portion 112 of each of the pinion members 108 engaged with the mounting hole 114 and disassembles the pinion members 108 from the drive gear 102. The disassembled pinion members 108 fall down through the hollow space 128 of the base member 122 and the opening 162 of the support member 130. The pinion members 108 may be further collected in a bin.

With the system 120, the operator may conveniently disassemble the drive pinion assembly 100 in a short time. Further, damages to the drive gear 102 and the pinion members 108 due to usage of tools may be avoided.

According to the present disclosure, the system 120 is used for disassembling the drive pinion assembly 100 of the starter motor. However, it may be contemplated that the system 120 may be used for disassembling various assemblies similar to the drive pinion assembly 100 with or without modification. Further, the base member 122, the actuating member 140 and positioning of the pin members 168 may be modified to disassemble any assembly having two components that are press fit together. Also, it may be understood that the method 200 of disassembling the drive pinion assembly 100 may be implemented for disassembling any assembly having two or more components that are press fit together.

While aspects of the current disclosure have been particularly shown and described above, it will be understood by those skilled in the art that various additional aspects may be contemplated by the modification of the disclosed machines, systems and methods without departing from the spirit and scope of what is disclosed. Such aspects should be understood to fall within the scope of the current disclosure as determined based upon the claims and any equivalents thereof.

What is claimed is:

1. A system for disassembling a drive pinion assembly of a starter motor, the drive pinion assembly comprising a drive gear and a pinion member coupled to the drive gear through a mounting hole defined in the drive gear, the system comprising:

a base member configured to support the drive pinion assembly therein, the base member comprising a through hole configured to align with the mounting hole of the drive gear;

a pin member configured to be slidably received in the through hole; and an actuating member disposed around the base member and rotatable about a rotational axis defined by the base member, the actuating member comprising a cam lobe configured to move the pin member towards the mounting hole of the drive gear based on movement of the actuating member about the rotational axis to disassemble the pinion member from the drive gear.

2. The system of claim 1, wherein the base member comprises:
a hollow space defined within a first end thereof to receive the drive pinion assembly therein; and
a support member coupled adjacent to a second end thereof for detachably supporting the base member on a work surface.

3. The system of claim 2, wherein the support member comprises an opening in communication with the hollow space of the base member to receive the pinion member to be disassembled from the drive gear.

4. The system of claim 2, wherein the actuating member comprises:
a first member rotatably disposed on the support member; and
a second member disposed on the first member, the second member comprising the cam lobe defined at an inner surface thereof to engage with the pin member;
wherein the first and second members are configured to rotate about the rotational axis.

5. The system of claim 4 further comprising a third member coupled with the first and second members, wherein the first, second and third members are configured to rotate about the rotational axis.

6. The system of claim 1, wherein the pin member comprises a head portion and a shank portion extending from the head portion, the shank portion slidably received within the through hole.

7. The system of claim 6, wherein the cam lobe is configured to engage the head portion of the pin member to move the pin member along a lateral axis defined together by the through hole of the base member and the mounting hole of the drive gear to disassemble the pinion member from the drive gear.

8. The system of claim 1, wherein the pin member is resiliently disposed within the through hole via an elastic member.

9. The system of claim 1, wherein the cam lobe defines a lobe lift greater than or equal to a length of the mounting hole of the drive gear.

10. The system of claim 4 comprising a handle coupled to the actuating member to receive an input from an operator and to rotate the actuating member about the rotational axis.

11. The system of claim 10, wherein the handle comprises:
a first handle member coupled to the first member of the actuating member; and
a second handle member coupled to the first handle member, and configured to receive the input from the operator.

12. A method of disassembling a drive pinion assembly of a starter motor, the drive pinion assembly comprising a drive gear and a pinion member coupled to the drive gear through a mounting hole defined in the drive gear, the method comprising:
supporting the drive pinion assembly on a base member, wherein an actuating member having a cam lobe is positioned around the base member;
aligning the mounting hole of the drive gear with a through hole defined in the base member, the through hole having a pin member disposed therein;
rotating the actuating member about a rotational axis defined by the base member, wherein the cam lobe moves the pin member towards the mounting hole to disassemble the pinion member from the drive gear.

13. The method of claim 12 further comprising supporting the base member, via a support member, on a work surface.

14. The method of claim 12, wherein the pin member comprises a head portion and a shank portion extending from the head portion, wherein the shank portion of the pin member is disposed within the through hole.

15. The method of claim 12, wherein the actuating member comprises:
a first member rotatably disposed on the support member; and
a second member disposed on the first member, the second member comprising the cam lobe defined at an inner surface thereof to engage with the pin member.

16. The method of claim 15, wherein the actuating member further comprises coupling the first and second members with a third member via fastening members.

17. The method of claim 12 further comprising moving the actuating member, via a handle, about the rotational axis.

18. The method of claim 12, wherein the cam lobe defines a lobe lift greater than or equal to a length of the mounting hole of the drive gear.

19. A system for disassembling a drive pinion assembly of a starter motor, the drive pinion assembly comprising a drive gear and a pinion member coupled to the drive gear through a mounting hole defined in the drive gear, the system comprising:
a base member configured to support the drive pinion assembly therein, the base member comprising a through hole configured to align with the mounting hole of the drive gear;
a pin member having a head portion and a shank portion extending from the head portion, the shank portion slidably received within the through hole; and
an actuating member disposed around the base member and rotatable about a rotational axis defined by the base member, the actuating member comprising:
a first member rotatably disposed around the base member; and
a second member disposed on the first member, the second member comprising a cam lobe defined at an inner surface thereof to engage with the head portion of the pin member, wherein rotation of the actuating member causes rotation of the cam lobe to move the pin member toward the mounting hole of the drive gear to disassemble the pinion member from the drive gear; and
a handle coupled to the actuating member to receive an input from an operator and to move the actuating member about the rotational axis.

20. The system of claim 19, wherein the cam lobe defines a lobe lift greater than or equal to a length of the mounting hole of the drive gear.

* * * * *